(12) United States Patent
Vadstrup (10) Patent No.: US 11,458,516 B2
(45) Date of Patent: Oct. 4, 2022

(54) CIRCULAR DISTRIBUTION APPARATUS

(71) Applicant: GEA SCAN-VIBRO A/S, Svendborg (DK)

(72) Inventor: Poul Vadstrup, Svendborg (DK)

(73) Assignee: GEA SCAN-VIBRO A/S

(*) Notice: Subject to any disclaimer, the term of this patent is extended or adjusted under 35 U.S.C. 154(b) by 633 days.

(21) Appl. No.: 16/488,353

(22) PCT Filed: Feb. 24, 2017

(86) PCT No.: PCT/DK2017/050051
§ 371 (c)(1),
(2) Date: Aug. 23, 2019

(87) PCT Pub. No.: WO2018/153415
PCT Pub. Date: Aug. 30, 2018

(65) Prior Publication Data
US 2020/0038921 A1 Feb. 6, 2020

(51) Int. Cl.
*B65G 47/72* (2006.01)
*B08B 9/093* (2006.01)
*B65B 37/04* (2006.01)
*B65G 47/14* (2006.01)

(52) U.S. Cl.
CPC .............. *B08B 9/093* (2013.01); *B65B 37/04* (2013.01); *B65B 2210/02* (2013.01); *B65B 2210/06* (2013.01); *B65G 47/1421* (2013.01); *B65G 47/72* (2013.01)

(58) Field of Classification Search
CPC .......... B65G 47/72; B65G 65/44; B65B 37/04

USPC .................................. 198/446, 533; 222/161
See application file for complete search history.

(56) References Cited

U.S. PATENT DOCUMENTS

| | | | | |
|---|---|---|---|---|
| 2,827,062 | A | * | 3/1958 | Nitsche .................. B65G 27/00 198/756 |
| 3,255,857 | A | | 6/1966 | Wendell et al. |
| 3,300,098 | A | | 1/1967 | Wilhelm et al. |
| 3,399,771 | A | | 9/1968 | Hryniowski |
| 3,563,420 | A | * | 2/1971 | Ansley .................. B65G 65/44 222/199 |

(Continued)

FOREIGN PATENT DOCUMENTS

| | | |
|---|---|---|
| CN | 105752368 A | 7/2016 |
| EP | 1010972 A1 | 6/2000 |
| GB | 2078209 A | 1/1982 |

*Primary Examiner* — Joseph A Dillon, Jr.
(74) *Attorney, Agent, or Firm* — Condo Roccia Koptiw LLP (57) ABSTRACT

A circular distribution apparatus for distributing loose products has a top portion (17) with an inlet (19) positioned centrally relative to a vertical central axis, a base portion (7) comprising an annular horizontal floor (11); a plurality of openable and closable outlets (23) provided in the annular floor (11); a side wall (9) surrounding entirely the annular floor (11); a central elevation (13) disposed between the annular floor (11) and the inlet (19); and a vibrator (51) configured to vibrate the base portion (7) so that products received on the base portion (7) circulate around the elevation (13) on the annular floor (11). The top portion (17); the elevation (13); the annular floor (11); and the side wall (9) provide a housing (3) comprising a distribution chamber (5), where at least the elevation (13), the annular floor (11) and the side wall (9) are provided integrally.

17 Claims, 7 Drawing Sheets

(56) References Cited

U.S. PATENT DOCUMENTS

| | | | | |
|---|---|---|---|---|
| 3,650,401 | A * | 3/1972 | Riesbeck | B07B 1/346 209/325 |
| 3,756,372 | A * | 9/1973 | Mertens | G21F 9/008 222/413 |
| 3,877,586 | A | 4/1975 | Quester | |
| 3,971,493 | A * | 7/1976 | Williams | B65G 65/44 141/351 |
| 4,276,157 | A * | 6/1981 | Haight | B65G 65/44 209/246 |
| 4,361,254 | A * | 11/1982 | Teraoku | B65D 90/626 222/196 |
| 4,384,535 | A * | 5/1983 | McKelvie | F23H 13/02 110/165 R |
| 4,487,338 | A | 12/1984 | Oshima et al. | |
| 4,844,289 | A | 7/1989 | Dumbaugh et al. | |
| 4,960,229 | A * | 10/1990 | Dumbaugh | F23G 5/444 222/161 |
| 4,966,273 | A | 10/1990 | Sashiki | |
| 5,046,643 | A * | 9/1991 | Dumbaugh | B65D 88/66 222/161 |
| 5,305,912 | A * | 4/1994 | Johnston | B65G 29/00 222/1 |
| 7,759,585 | B2 * | 7/2010 | Widmer | G01G 19/393 141/132 |
| 8,517,169 | B2 | 8/2013 | Kirkbride et al. | |
| 9,010,540 | B2 * | 4/2015 | Smith | B07B 1/06 209/326 |
| 9,782,801 | B2 * | 10/2017 | Alamzad | B07B 1/42 |
| 2011/0005896 | A1 | 1/2011 | Kirkbride et al. | |
| 2012/0074341 | A1 | 3/2012 | Untch et al. | |

* cited by examiner

CIRCULAR DISTRIBUTION APPARATUS

CROSS REFERENCE TO RELATED APPLICATIONS

This application is the National Stage Entry under 35 U.S.C. § 371 of Patent Cooperation Treaty Application No. PCT/DK2017/050051, filed Feb. 24, 2017, the contents of which are hereby incorporated by reference herein.

The present invention relates to a circular distribution apparatus for distributing loose products, comprising a vertical central axis; an inlet; a base portion comprising an annular floor extending substantially horizontally in a radial direction relative to the vertical central axis; a plurality of outlets provided in said annular floor, each outlet comprising a valve member configured to move between a closed position and an opened position to allow the products to leave the apparatus through at least one of the outlets; a side wall entirely surrounding the annular floor; a central elevation disposed between the annular floor and the inlet; and a vibrator configured to vibrate the base portion so that the loose products received on the base portion moves in a substantially circular manner around the elevation on the annular floor.

The apparatus according to the invention may e.g. be used in the food or pharmaceutical industry, but it is not limited to any specific use.

An apparatus of this kind is disclosed in U.S. Pat. No. 3,300,098 showing several embodiments comprising generally a central inlet duct from where a loose material is directed onto an annular track surrounding a horizontal cone with a vertical central axis. The apparatus is vibrated to promote a circulating movement of the material in the track. Along the track, in the floor thereof, several outlets are provided; each provided with a valve member for opening and closing the outlet for optionally letting material out through the respective outlets. Apart from U.S. Pat. No. 3,300,098, such apparatus of said general kind are known from i.a. U.S. Pat. Nos. 3,877,586, 4,487,338, 4,966,273, 8,517,169, and 3,399,771. The latter discloses an apparatus in which a base portion; a side wall portion comprising a side wall; and volutes extending therefrom to provide outlets, and a top portion are interconnected by means of clamping rings to form a casing.

The circular distribution apparatus according to the invention may be used for distributing a loose product to different recipients, one for each outlet, whereby a flow of the loose product to the respective recipients can be opened or stopped independently. This is due to the fact that factors relating to the respective recipient determine whether a recipient is ready or not for receiving the loose product. E.g. each or all recipients might be a packaging facility packaging the loose product in a packaging material which needs replenished from time to time, during which time the individual packaging facility is unable to handle incoming product. Loose products to be distributed by means of the circular distribution apparatus may e.g. be dried, semi-dried, moist, or frozen, grain, powder, granules, pellets, etc.

For instance, within the food and pharmaceutical industry keeping a good hygiene and an aseptic environment, respectively, is an ever important area of focus in production.

It is an object of the present invention to provide a circular distributing apparatus, as mentioned by way of introduction that provides for a sanitary apparatus promoting improved hygiene and facilitating cleaning procedures. By the term "sanitary" is meant that the equipment should comply with relevant regulations within the food industry, among other USDA 3A (US), NZFSA (New Zealand) and/or EHEDG (EU) guidelines, and within the term "aseptic" within the pharma industry, respectively. The terms "sanitary" and "hygienic" are herein used interchangeably.

This object is obtained in that the inlet is provided centrally in a top portion connected to the side wall, and that the top portion, the elevation, the annular floor and the side wall provide a housing comprising a distribution chamber where at least the elevation, the annular floor and the side wall are provided integrally. By providing the elevation, the annular floor and the side wall integrally results in providing a unitary lower part, i.e. the base portion, of the circular distributing apparatus. This lower part is the part of the apparatus that supports the loose product during use and by providing it integrally formed it may more easily be provided without joints and cracks that might otherwise accommodate small parts of the loose product which then hinders an effective cleaning and constitute a hygienic problem.

Obtaining the elevation, the annular floor and the side wall integrally may be provided using suitable production methods such as sheet metal forming e.g. spinning or deep drawing; or welding and subsequently grinding and polishing the welding joints. These processes are mentioned as examples only and the invention is not limited by these. The skilled person in metal working is able to conceive other sanitary ways of providing such lower part.

When providing for connection of the top portion, the elevation, the annular floor and the side wall to provide a housing the angles between them are preferably kept large e.g. over 90° or kept easily accessible for cleaning fluid etc. and their creases to a minimum.

By providing a housing with at least an integral lower part, this also minimizes the height and width of the apparatus and provides a more compact design than otherwise possible. By providing a more compact apparatus, in particular in height, the sum of the inlet duct, apparatus and outlet ducts can take up much less space, which is advantageous, since these distribution apparatuses generally service large size storage silos and vertical packaging lines, and any decrease in height/size also decrease the size requirements for the buildings/silos which houses them. And as the building costs are relatively large compared to the costs of the distributing apparatuses, a relatively large cost deduction can be foreseen for the entire plant.

In an embodiment the top portion is provided integrally with the side wall which further enhances the possibility to improve the sanitary nature, reduces the risk of dusting and spillage, and promotes the compactness of the apparatus.

In a further embodiment the elevation has a summit centrally relative to the vertical central axis, and in a still further embodiment the elevation is of a conical, cupola or pyramid shape, without or only having a slight frustum. These embodiments promote an even distribution of the loose product to the annular floor of the apparatus and to the circular flow within.

In a practical embodiment the inlet comprises a duct connection for connection with a duct. Hereby, a hygienic connection may be obtained to an upstream part of a facility in which the apparatus of the invention is applied.

In an embodiment the side wall is substantially vertical. This promotes an even speed of advancement at all levels of a loose product circulating on the annular floor during use, and further improves guiding the loose product down towards the outlets, e.g. having downwardly turning valve members.

In an embodiment the annular floor has a radial width between the side wall and the elevation, and the outlets extend substantially throughout the entire radial width of the annular floor. Hereby is avoided that loose product circulating on the annular floor continues to circulate for an extended time by passing radially besides open outlets.

In an embodiment each outlet comprises a duct connection below the annular floor and below the valve member. Hereby a hygienic connection may be obtained to downstream parts of a facility in which the apparatus of the invention is applied.

In some embodiments the circular distribution apparatus is provided for Cleaning-In-Place, so-called CIP, whereby at least parts of the apparatus are cleaned by subjecting such parts to a spray of a cleaning fluid without dismantling the apparatus.

Thus in a further embodiment at least one CIP nozzle is provided within the duct connection below the valve member. Hereby is provided for cleaning an outlet part below the valve member by a CIP procedure, thus further enhancing the hygienic nature of the apparatus.

In an embodiment at least one CIP nozzle is provided inside the distribution chamber. Hereby is provided for convenient and effective cleaning of an interior of the distribution chamber by a CIP procedure, thus further enhancing the hygienic nature of the apparatus.

In a further embodiment the annular floor is sectionally sloping along a circumferential direction towards the outlets. Hereby self-emptying properties of the apparatus are enhanced since e.g. liquid used for cleaning, e.g. by a CIP procedure, may be drained more conveniently from the annular floor towards the outlets.

In an embodiment the housing is contained. Hereby is obtained that the apparatus may be applied as a component of a facility having containment properties. Containment has been the focus of attention for a number of years, i.a., due to the increased awareness of the potential risk of operator exposure to the highly potent substances often involved within the pharmaceutical field or reducing the risk of powder explosion safety or allergenic exposure to the same personnel in the food and nutraceutical industry. When in the pharmaceutical field, exposure data may be evaluated for instance by a SMEPAC (Standardized Measurement of Equipment Particulate Airborne Concentration) test. SMEPAC has been adopted into the ISPE-Guide "Assessing the Particulate Containment Performance of Pharmaceutical Equipment" (ISBN: 1-931879-35-4). Within the context of the invention the term "contained" means that unit operations employed in e.g. a process to form tablets from e.g. powders of an Active Pharmaceutical Ingredient (API) and excipients are contained in modules used, which are therefore segregated from the surrounding environment. Thus, the operator does not need to have any direct access to the individual unit operations during operation, which may be accesses via the respective releasable inlet duct and outlet ducts. In practice, a desired level of containment is chosen among such levels as contained or dust-tight (10-100 mcg/$m^3$), high contained (1-10 mcg/$m^3$) and total contained (<1 mcg/$m^3$), and suitable equipment is chosen in accordance with the desired containment levels. The term "contained" within the context of the present application is defined by its level of containment according to suitable measurement, and is thus defined as at least dust-tight. The term "dust" may be defined as fine particles.

In an embodiment the vibrator comprises a number of vibration members rigidly attached adjacent to the side wall. Hereby a low building height of the apparatus is obtained, i.e. a physically more compact apparatus is provided.

In a further practical embodiment the number of vibration members is two, and the two vibration members are positioned mutually diametrically opposite each other, relative to the vertical central axis, on an outside of the side wall. The vibration members per se may be of a previously known construction. By positioning them on the external side of the side wall instead of below the distribution chamber as shown in prior art, where the vibration also was transmitted indirectly by vibration members, it is now advantageously possible to position the apparatus selectively, e.g. on a top side thereof connected by wires to a ceiling of a silo or building, as shown in the appended drawings, or a bottom side, standing on a floor or hanging from a wall, rack or frame. Using in this way "direct" and not what is known as "indirect" vibration further enhances the compactness of the apparatus, and removes the risk of destructive resonances, which was a further issue with indirect vibrators.

In a still further embodiment the apparatus comprises reinforcing ribs on an outside of the housing, preferably including radial ribs extending diametrically across the housing. This promotes the rigidity of the apparatus which further promotes the two or more vibration members to function as a single vibrator, and protects the apparatus from shearing forces experienced therefrom.

In an embodiment the top portion comprises at least one inspection hatch to enable entry to dislodge stuck products and to inspect cleaning need or effectiveness of the at least one CIP-nozzle.

In the following the invention will be explained in further detail by way of example having reference to the accompanying schematic drawings, in which.

The figures show as an example an embodiment of a circular distribution apparatus 1 according to the present invention.

The circular distribution apparatus 1 comprises a housing 3 defining a distribution chamber 5, the housing 3 having a base portion 7 provided by a side wall 9, an annular floor 11, and a central elevation 13, i.e. the upper surface of the base portion 7 is raised at the centre and smoothly slants downwardly radially towards the periphery. The housing further comprises a top portion 17 with an inlet 19. The circular distribution apparatus 1 has a vertical central axis 21 and in the present embodiment the central elevation 13, the annular floor 11 and the side wall 9 are arranged as concentric circles around the vertical central axis 21.

In the embodiment shown the annular floor 11 is extending substantially horizontally in radial directions that are radial relative to the vertical central axis 21, and the side wall 9 is vertical in the present embodiment. Thus in the embodiment shown the side wall 9 is provided as an endless, continuous wall that entirely surrounds the annular floor 11.

Figure 1:
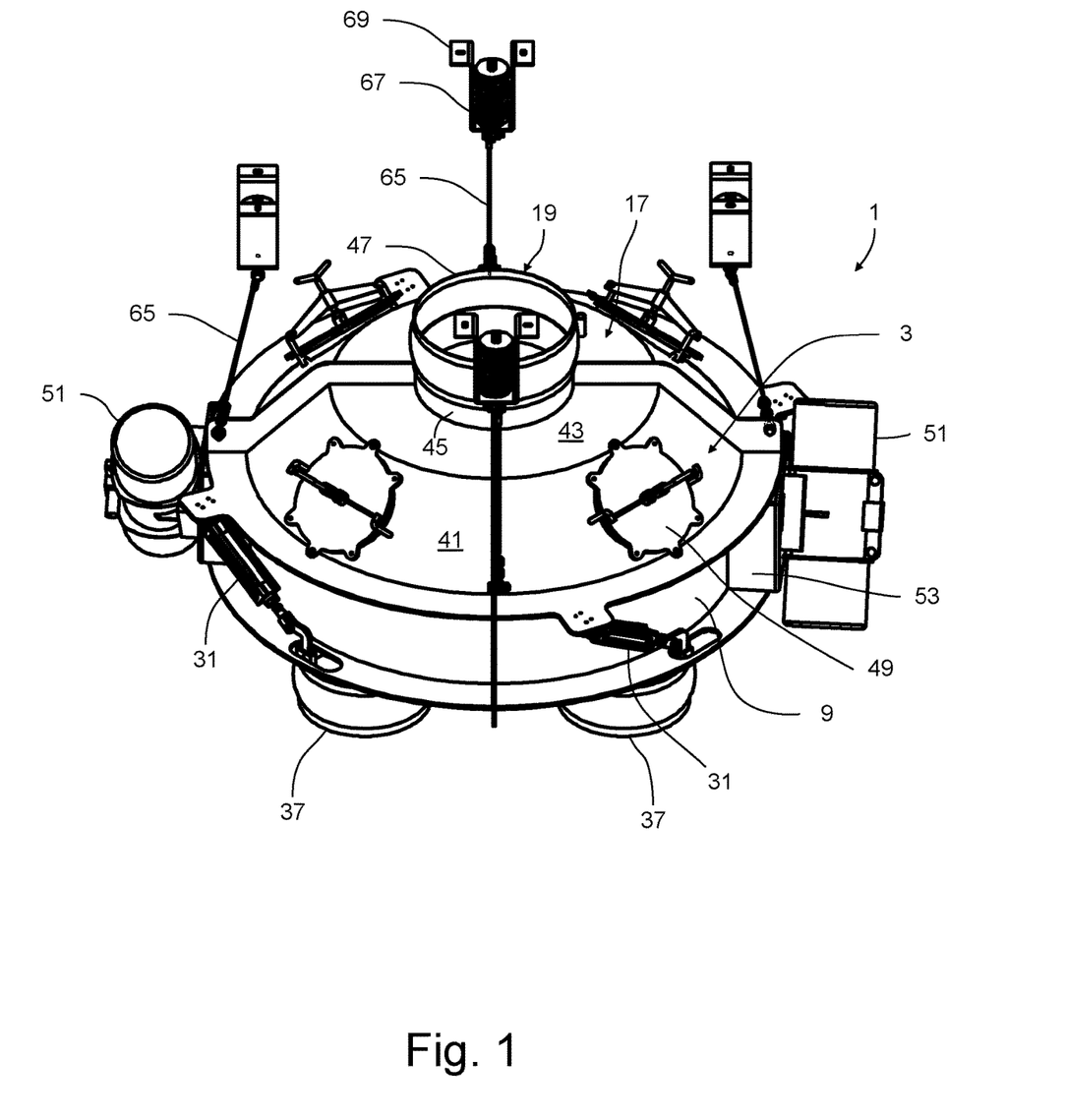
FIG. 1 is a perspective view oblique from above of a circular distribution apparatus according to one embodiment of the present invention.
Figure 2:
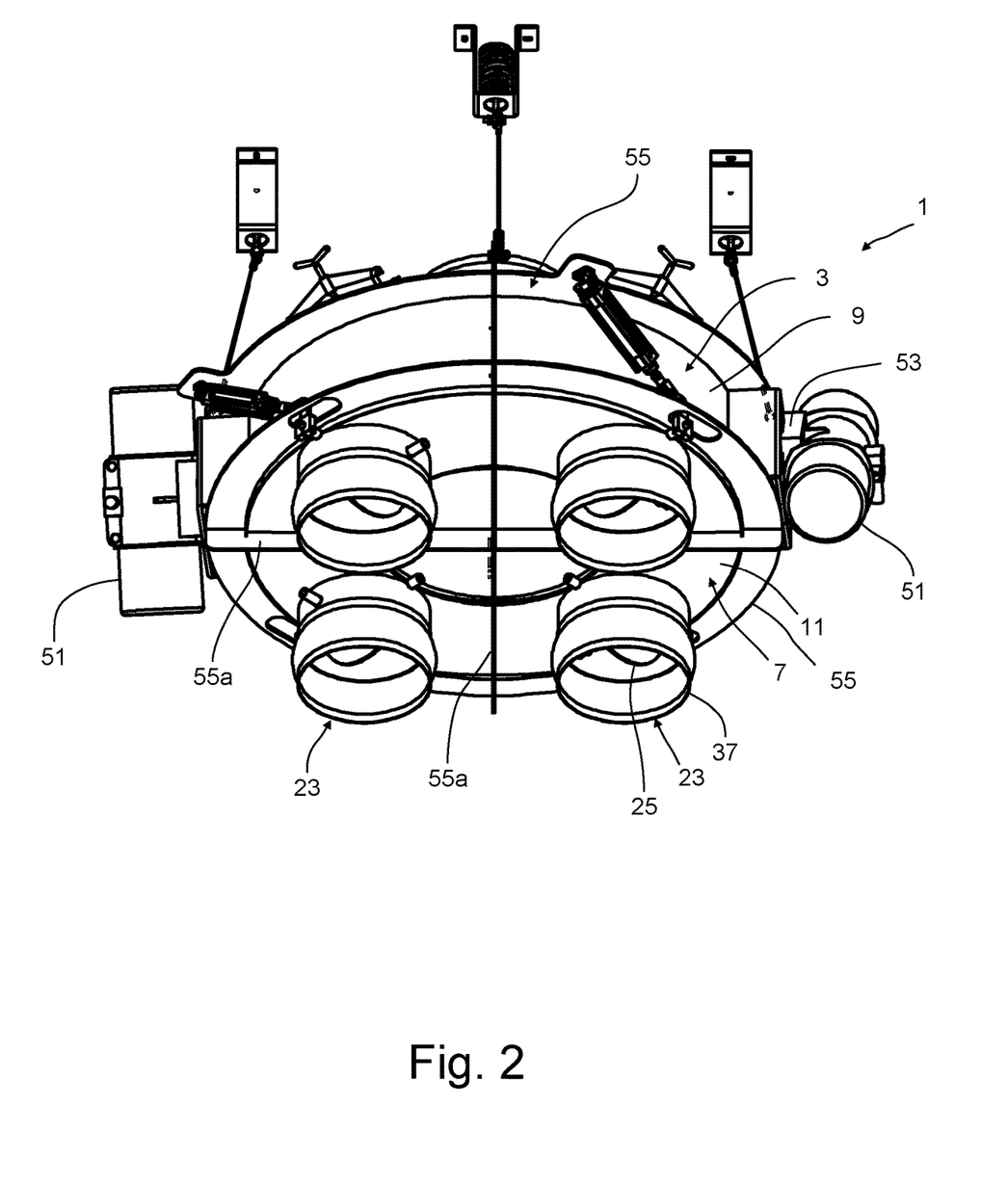
FIG. 2 is a perspective view oblique from below of the circular distribution apparatus.
Figure 3:
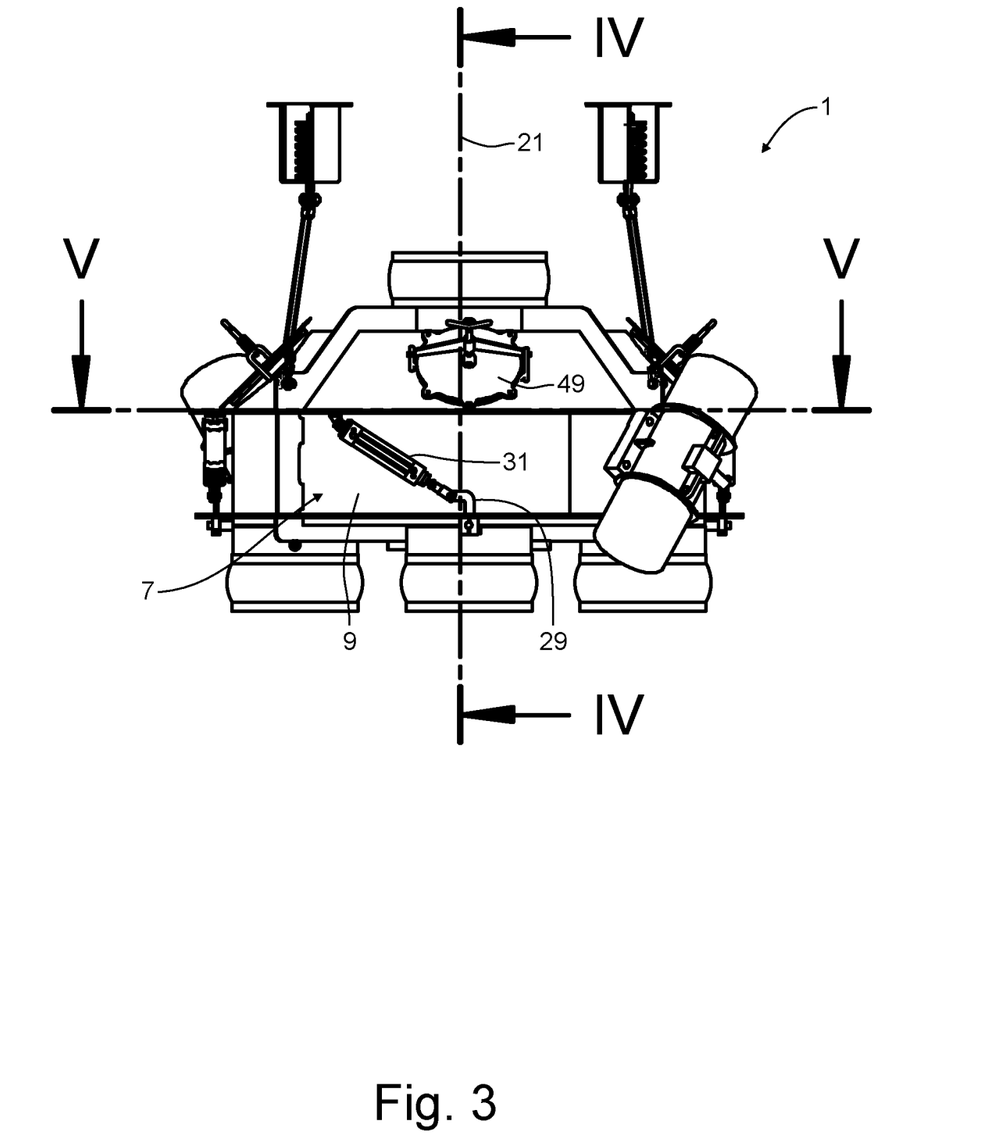
FIG. 3 is a side view of the circular distributing apparatus.
Figure 5:
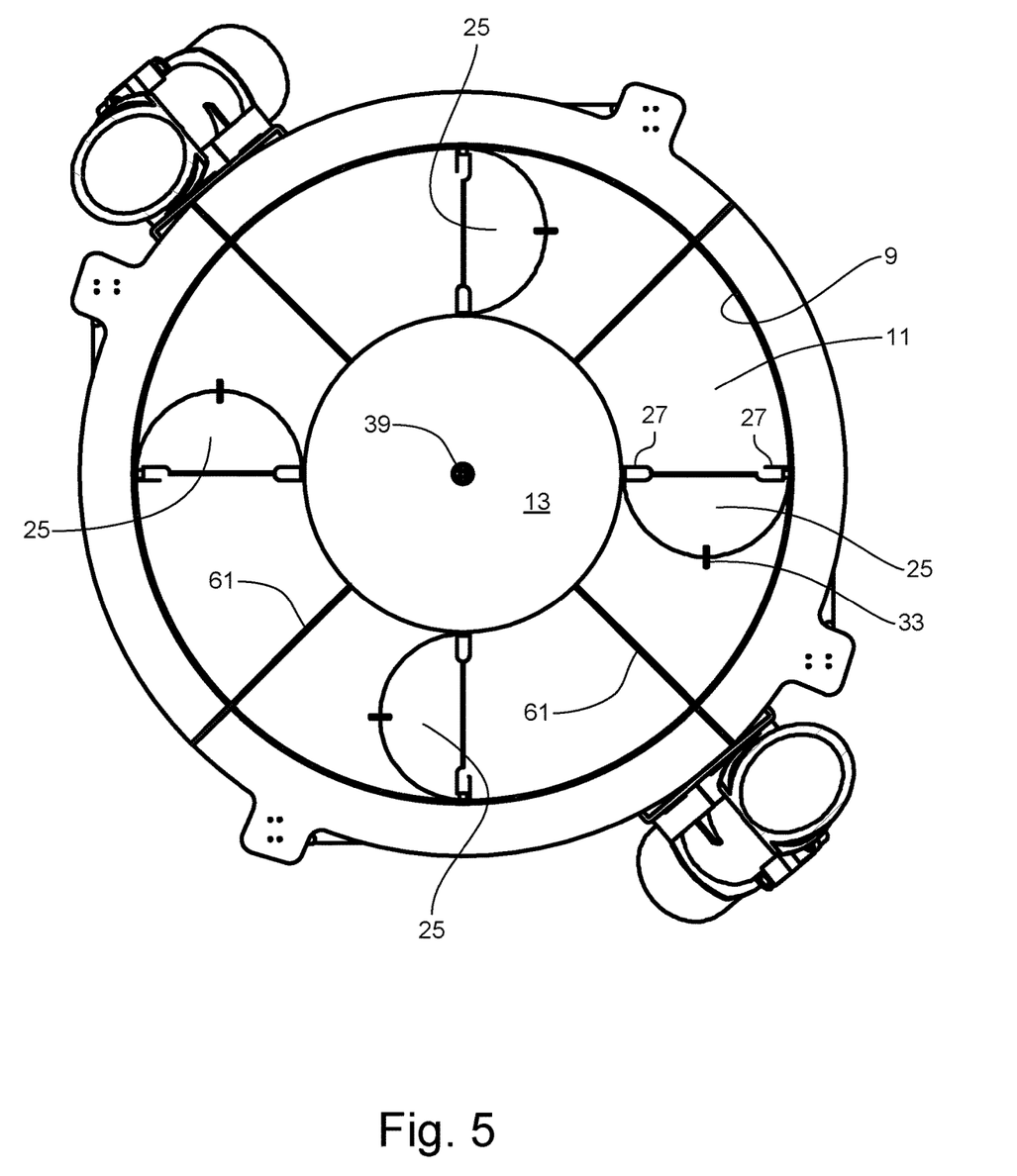
FIG. 5 shows a horizontal section as indicated by line V-V in FIG. 3.
Figure 6:
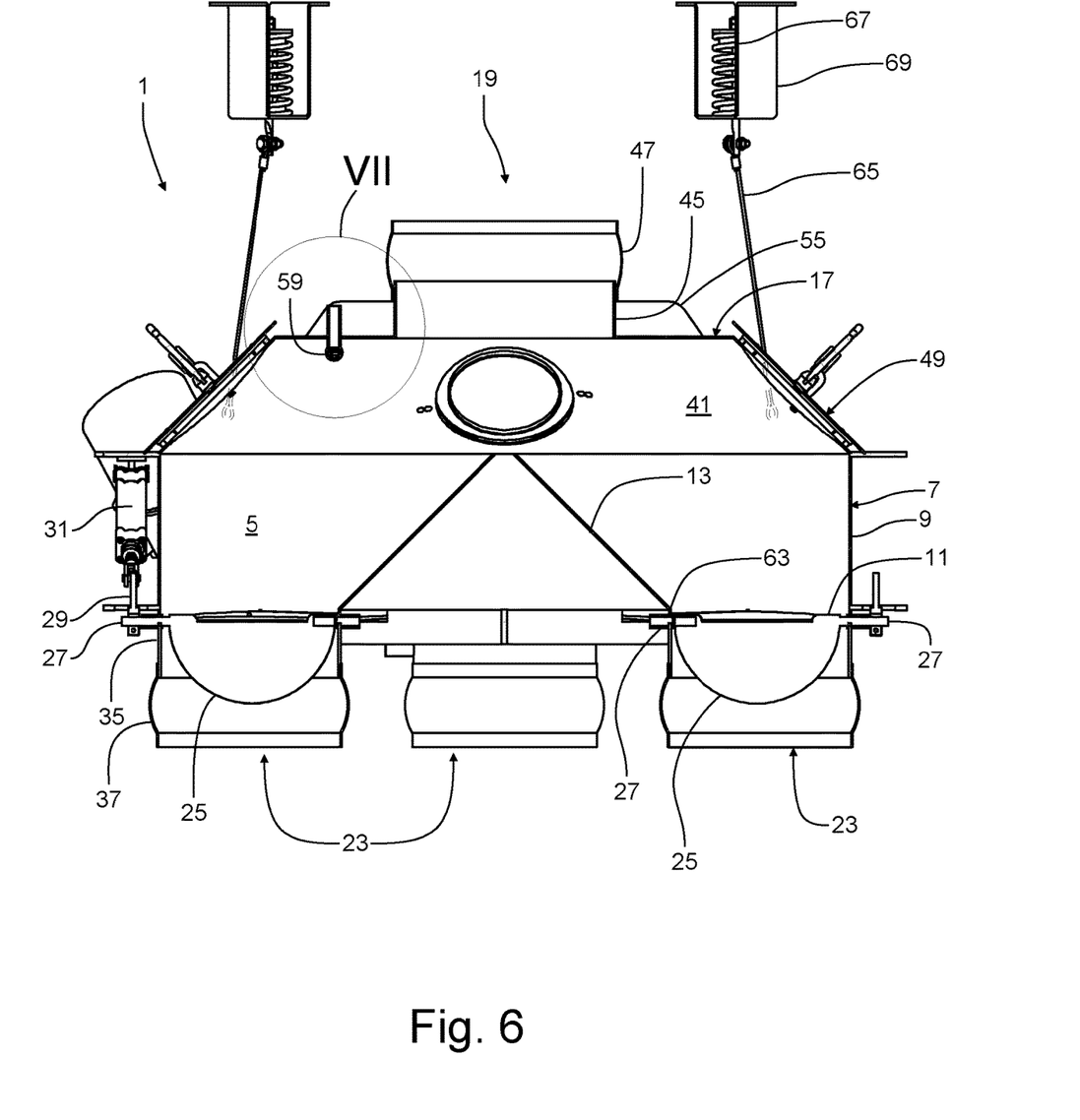
FIG. 6 shows a vertical section through the vertical central axis similar to FIG. 4 but sectioned through a vertical plane oriented perpendicular to the vertical plane of FIG. 4.

A plurality of outlets 23 are provided in the annular floor 11. In the present embodiment four such outlets 23 are provided but any other number might be provided in accordance with actual needs. Each outlet 23 comprises a valve member 25 configured to move between a closed position (see FIG. 5) and an open position (see FIGS. 2 and 6) to allow a product to leave the apparatus through one or more of the outlets 23 when open, and preferably no product or dust from these to leave them, when closed. The valve members 25 are in the present embodiment semi-circular gates to allow them to rotate around radially extending axes defined by journals 27 (see FIGS. 5 and 6). Radially outwards journals 27 are connected with arms 29 which per se are connected with pneumatic actuators 31 for the latter to individually rotate the valve members 25 between their opened positions and closed positions. Inside the distribution chamber 5 abutments 33 are provided at the annular floor 11 to define the closed positions of the respective valve members 25. As it especially appears from FIG. 5 the outlets 23 and their respective valve members 25 extend throughout the width, i.e. the radial extent, of the annular floor 11 between the elevation 13 and the side wall 9.

Whereas, in the present embodiment the valve members are configured to provide what might be seen as a semi-butterfly valve, the valve members might alternatively be configured to provide ordinary fully circular butterfly valves or e.g. iris valves might be used. However, the valves must be able to withstand stress due to vibrations of the apparatus as will be explained below and preferably the valves should allow CIP i.e. sanitary cleaning in place after use as will also be explained below.

Below the floor 11 the outlet 9 is extended by an outlet pipe stub 35 the latter being connected to an outlet flexible sleeve 37. The outlet pipe stub 35 is provided integrally with the material of the annular floor 11. The outlet pipe stub 35 and the outlet flexible sleeve 37 together constitute a duct connection for connection with a releasable outlet duct, as it will be explained below.

The central elevation 13 is placed beneath the inlet 19 and is in the present embodiment formed as a cone with a summit 39 positioned at the vertical central axis 21. Thus the elevation 13 is disposed between the annular floor 11 and the inlet 19 to receive product from the inlet 19 and redirect this product to the annular floor 11. The distance from the inlet 19 to the apex of the elevation 13 can be selected according to type of product expected to be distributed by the apparatus 1, in particular relative to the product's fragility, size, bounce-ability and other factors determining a suitable distance for the product to fall and distribute into the circular vibration flow in the distribution chamber 5.

The elevation 13, the annular floor 11 and the side wall 9 are integral, in the embodiment shown made from stainless steel sheet material. Other easily cleaned metals may alternatively be utilized, such as grade steel, iron, and the like. Other materials may also be employed, e.g. plastics, ceramics or the like. Thus the elevation 13, the annular floor 11 and the side wall 9 may in an embodiment be made by spinning or deep drawing a blank or by welding together blank pieces and subsequently grinding and polishing the welding joints to provide an internal surface of the base portion free of joints or cracks to provide an easy-to-clean surface.

The top portion 17 comprises integrally, i.e. in one unit, a conical section 41, an annular section 43 and an inlet pipe stub 45; the latter being connected to an inlet flexible sleeve 47 to provide the inlet 19. The inlet pipe stub 45 and the inlet flexible sleeve 47 together constitute a duct connection for connection with a releasable inlet duct, as it will be explained below.

The conical section 41 comprises a number of inspection hatches 49. In the present embodiment, the number of inspection hatches 49 is four, but any other number might be chosen. The inspection hatches 49 may be embodied as disclosed in the applicant's elder international patent application published under No. WO 2016/189110 A1.

The top portion 17 may in the present embodiment be connected to the side wall 9 by welding and the surface of the welding internally of the distribution chamber 5 may subsequently be grinded and polished to provide an internal surface of the distribution chamber 5 free of joints or cracks to provide an easy-to-clean internal surface of the distribution chamber 5.

The circular distribution apparatus 1 includes a vibrator configured to vibrate the housing 3 including the base portion 7 so that product received on the base portion moves in a substantially circular manner around the central elevation 13 on the annular floor 11 inside the distribution chamber 5.

In the present embodiment the vibrator comprises two vibration members 51 attached directly and rigidly to the side wall via brackets 53. The vibration members 51 may in the present embodiment be of a kind known per se and comprising an asymmetric load rotated by a motor around an axis of rotation extending in a longitudinal direction of the respective vibration member 51. In the embodiment the axes of rotation of the two vibration members 51 extend in respective, mutually parallel, tangential planes on opposite sides of the housing 3. In the present embodiment the axes of rotation are tilted relative to the vertical by in opposite directions by angles of similar size, e.g. 35°.

By means of the vibrator the housing 3 including the base portion 7 and especially the annular floor 11 are imparted a circulating movement of an amplitude of e.g. 5-15 mm, e.g. 12 mm, as it is known in the art, whereby a product or products resting on the annular floor 11 will be imparted a unidirectional circulating movement around the vertical axis 21 on the annular floor 11.

On an outside of the housing 3 reinforcing ribs 55 are provided to provide the housing as a rigid body into which the vibrations provided by the vibration members 51 are induced as by a unitary vibrator. The reinforcing ribs 55 comprise radial ribs 55a extending diametrically across the housing 3.

Figure 4:
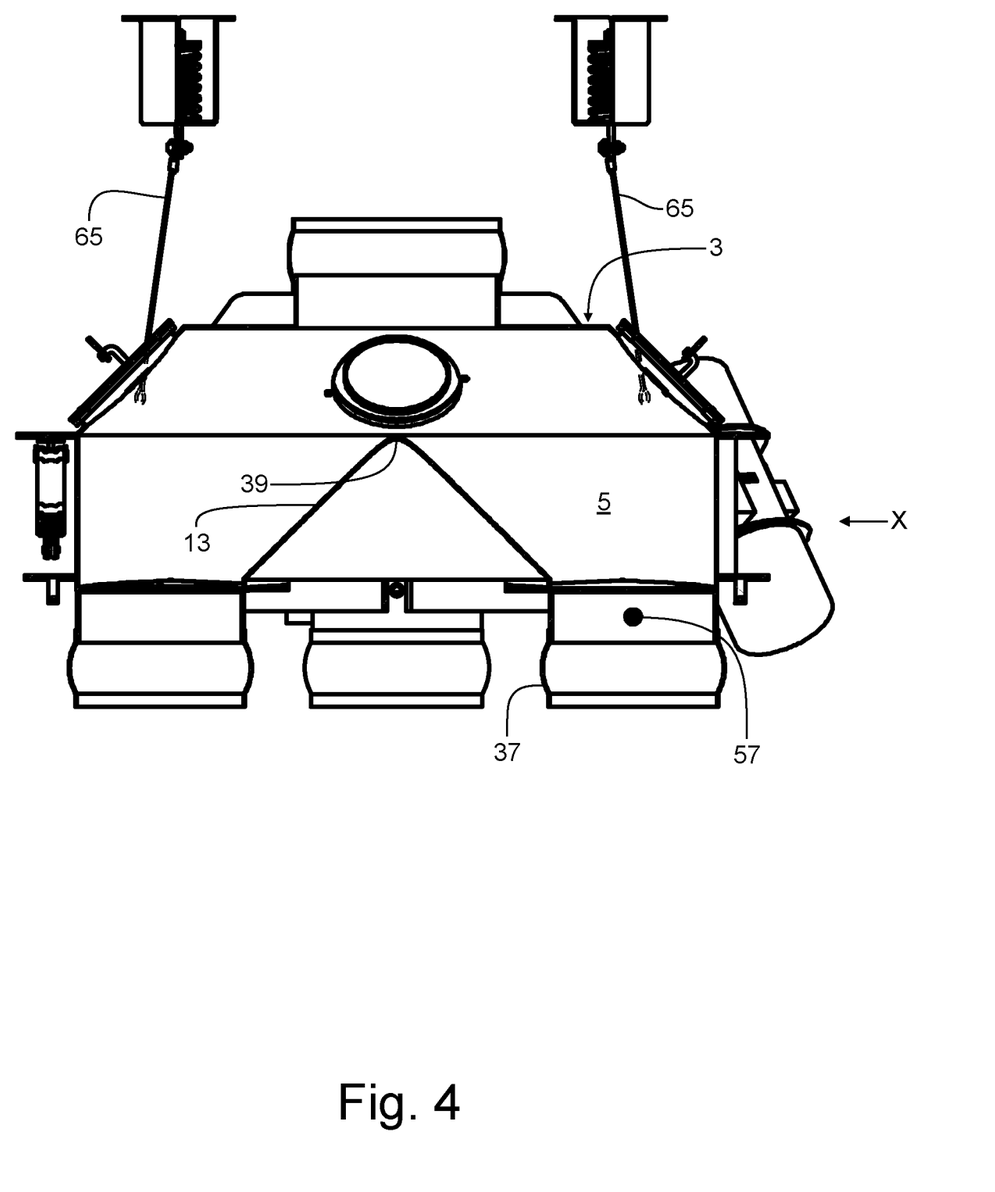
FIG. 4 shows a vertical section along a vertical plane comprising a vertical central axis of the circular distribution apparatus as indicated by line IV-IV in FIG. 3.
Figure 7:
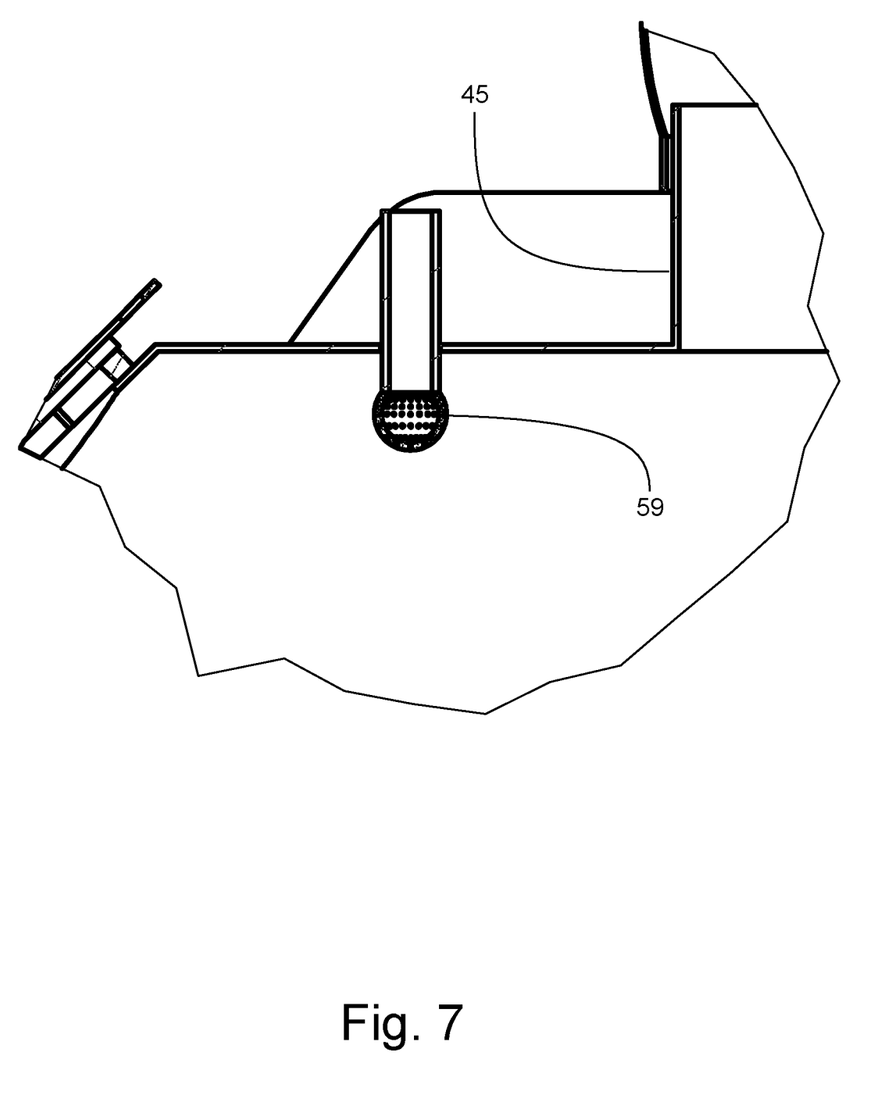
FIG. 7 shows a detail of FIG. 6 as indicated by circle VII.

In the embodiment shown the circular distribution apparatus 1 is provided for eased cleaning by a Cleaning In Place (CIP) procedure i.e. without dismantling the apparatus. Thus, an outlet CIP nozzle 57, see FIG. 4, is provided at each outlet 23 below the valve member 25 inside the outlet pipe stub 35 and a distribution chamber CIP nozzle 59 is provided inside the distribution chamber 5, see FIG. 6. The distribution chamber CIP nozzle 59 is of a construction known per se and is shown enlarged in FIG. 7. Thus the distribution chamber CIP nozzle 59 comprises a spherical body covered with nozzle openings for the distribution chamber CIP nozzle 59 during a cleaning procedure to spray cleaning liquid in all directions to clean the entire inner surface of the distribution chamber 5. The outlet CIP nozzles 57 are in the shown embodiment of a construction similar to the construction of the distribution chamber CIP nozzle 59, but may be different or not be provided at all, according to need and/or product.

To provide for easier draining of the liquid being used during a CIP procedure, the annular floor 11 is sloping slightly towards the outlets 23. Thus sections of the annular floor are sloping 0°-5°, especially 1°-3°, e.g. 2°, from radial lines 61 towards the outlets 23. Thus, the respective sections of the annular floor 11 between the radial lines 61 and the outlets 23 are sloping in circumferential directions towards the outlets 23.

As mentioned above in the embodiment shown in the figures the central elevation 13 is formed as a cone i.e. it is conical shaped. In the alternative, it might e.g. be pyramid shaped, with three or more side faces. Likewise, the side wall 9 and the adjoining outer part of the annular floor 11 are in the embodiment shown circular, but they might be polygonal. However, to facilitate cleaning and drying out during CIP the circular embodiment is preferred. The central elevation 13 may in addition to its conical portion comprise a transition, such as a low vertical transition wall 63 between said conical portion and the annular floor 11, see FIG. 6.

In the embodiment shown the housing 3 is contained. This provides for incorporating the circular distribution apparatus 1 into facilities and product handling plants, where containment is pursued or needed. Thus the apparatus may be used as a module within pharma, and may be contained as defined in the ISPE-Guide "Assessing the Particulate Containment Performance of Pharmaceutical Equipment" mentioned in the opening part of the present description.

The term "contained" within the context of the present application should be understood as at least dust-tight according to the above-identified standard.

Containment of a facility on one hand provides for protecting operators against products being processed as mentioned above. However, it is also possible that containment or dust-free conditions are pursued in order to protect delicate products being processed against the environments.

The housing 3 being contained entails that the walls of the housing, including the side wall 9, are tight to the chosen level, that the connections between the inlet and outlet pipe stubs 45, 35 and their respective flexible sleeves 47, 37 and also the further connections with the releasable inlet and outlet ducts are correspondingly tight, and that any penetration of the material of the housing 3 such as for the journals 27 of the valve members 25 are made in a correspondingly tight manner. Likewise, the inspection hatches 49 must be correspondingly tight when closed.

In use, the circular distribution apparatus 1 is suspended for the housing 3 to be able to perform a circulating vibration movement imparted by the vibrator. In the embodiment shown the circular distributing apparatus 1 is suspended by four wires 65 attached via springs 67 to brackets 69 that may e.g. be attached to a ceiling or another fixed structure not shown. A releasable inlet duct, not shown, is connected to the inlet flexible sleeve 47, and releasable outlet ducts, likewise not shown, are connected to the outlet flexible sleeves 37. Due to the presence of the inlet and outlet flexible sleeves 47, 37 the housing 3 may perform its circulating vibration movement without the releasable inlet and outlet duct vibrating correspondingly.

A flow of product to be distributed is introduced into the housing 3 through the releasable inlet duct and the inlet 19. The vibrator is activated to impart circulating vibration movement directly to the housing 3. The product introduced into the housing 3 will accordingly slide via the central elevation 13 to be evenly distributed on the annular floor 11 where the product will circulate around the vertical central axis 21. The valve members 25 are according to actual needs opened and the product on the annular floor 11 will exit through the outlets 23 when arriving at an outlet 23 with a valve member 25 in its opened position. Due to the fact that the valve members 25 extend throughout the entire width, i.e. the radial extent, of the annular floor 11, any product circulating on the annular floor 11 will exit through the outlets 23. Therefore, there is a very low risk that any product circulates for an extended time by circumventing open outlets, or gather at any closed valve members 25, when this happens during distribution, and therefore there is a low risk of product being left inside the distribution chamber 5 getting stale or mouldy, or that any frozen product is left behind and gets thawed up.

The circular distribution apparatus according to the invention may e.g. be applied in the food industry such as for a dairy product and the product to be distributed may be shredded or ball-sized frozen cheese. For such application the diameter of the distribution chamber 5 might be e.g. 125 cm to provide a distribution capacity of 50,000 l/hr, or other sizes to suit other needs and capacities.

For application in pharmaceutical industry a diameter of the distribution chamber of around 10-80 cm may be appropriate.

The invention claimed is:

1. A circular distribution apparatus for distributing loose products, comprising:
   a vertical central axis;
   an inlet positioned centrally relative to the vertical central axis;
   a base portion comprising an annular floor extending substantially horizontally in a radial direction relative to the vertical central axis;
   a plurality of outlets provided in the annular floor, each of the plurality of outlets comprising a valve member configured to move between a closed position and an open position to allow products to leave the apparatus through at least one of the plurality of outlets;
   a side wall surrounding entirely the annular floor;
   a central elevation disposed between the annular floor and the inlet, whereby the elevation is disposed beneath the inlet, defining a distance from the inlet to an apex of the elevation; and
   a vibrator configured to vibrate the base portion so that products received on the base portion move in a substantially circular manner around the elevation on the annular floor;
   wherein the inlet is provided in a top portion connected to the side wall, and wherein the top portion, the elevation, the annular floor, and the side wall provide a housing comprising a distribution chamber, where at least the elevation, the annular floor, and the side wall are provided integrally.

2. The circular distribution apparatus of claim 1, wherein the top portion is provided integrally with the side wall.

3. The circular distribution apparatus of claim 1, wherein the elevation has a central summit relative to the vertical central axis.

4. The circular distribution apparatus of claim 3, wherein the elevation is of a conical, cupola, or pyramid shape, without a frustum or only having a slight frustum.

5. The circular distribution apparatus of claim 1, wherein the inlet comprises a duct connection for connection with a duct.

6. The circular distribution apparatus of claim 1, wherein the side wall is substantially vertical.

7. The circular distribution apparatus of claim 1, wherein the annular floor has a radial width between the side wall and the elevation, and wherein the plurality of outlets extend throughout the entire radial width of the annular floor.

8. The circular distribution apparatus of claim 1, wherein each of the outlets comprises a duct connection below the annular floor and below the valve member.

9. The circular distribution apparatus of claim 8, wherein at least one Cleaning-in-Place (CP) nozzle is provided within at least one of the duct connections below the valve member.

10. The circular distribution apparatus of claim 1, wherein at least one CIP nozzle is provided inside the distribution chamber.

11. The circular distribution apparatus of claim 1, wherein the annular floor is sectionally sloping along a circumferential direction towards the plurality of outlets.

12. The circular distribution apparatus of claim 1, wherein the housing is contained to be at least dust-tight.

13. The circular distribution apparatus of claim 1, wherein the vibrator comprises a number of vibration members attached rigidly adjacent to the side wall.

14. The circular distribution apparatus of claim 13, wherein the number of vibration members is two, and the two vibration members are positioned mutually diametrically opposite each other, relative to the vertical central axis, on an outside of the side wall.

15. The circular distribution apparatus of claim 1, comprising reinforcing ribs on an outside of the housing.

16. The circular distribution apparatus of claim 1, wherein the top portion comprises at least one inspection hatch.

17. The circular distribution apparatus of claim 15, further comprising radial ribs extending diametrically across the housing.

* * * * *